United States Patent
Yan et al.

(10) Patent No.: US 9,609,656 B2
(45) Date of Patent: Mar. 28, 2017

(54) METHOD FOR ADJUSTING RESOURCE CONFIGURATION, RADIO NETWORK CONTROLLER, AND BASE STATION

(71) Applicant: HUAWEI TECHNOLOGIES CO., LTD., Shenzhen, Guangdong (CN)

(72) Inventors: Kun Yan, Shenzhen (CN); Bingzhao Li, Shenzhen (CN); Yanyan Chen, Shenzhen (CN); Xiaoxiao Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 14/583,535

(22) Filed: Dec. 26, 2014

(65) Prior Publication Data

US 2015/0110060 A1 Apr. 23, 2015

Related U.S. Application Data

(63) Continuation of application No. PCT/CN2012/077703, filed on Jun. 28, 2012.

(51) Int. Cl.
 *H04W 72/04* (2009.01)
 *H04W 28/16* (2009.01)
 *H04L 5/00* (2006.01)

(52) U.S. Cl.
 CPC ....... *H04W 72/0493* (2013.01); *H04W 28/16* (2013.01); *H04L 5/0091* (2013.01)

(58) Field of Classification Search
 CPC combination set(s) only.
 See application file for complete search history.

(56) References Cited

U.S. PATENT DOCUMENTS 8,145,253 B2 * 3/2012 Pani ................. H04W 52/38
 455/522
8,243,633 B2 * 8/2012 Hwang ............ H04W 36/0055
 370/252

(Continued)

FOREIGN PATENT DOCUMENTS

CN 101005693 A 7/2007
CN 101035085 A 9/2007

(Continued)

OTHER PUBLICATIONS

3GPP TS 25.302 V11.0.0; 3rd Generation Partnership Project; Technical Specification Group Radio Access Network; Services provided by the physical layer (Release 11); Dec. 2011; total 97 pages.

(Continued)

Primary Examiner — Frank Duong
(74) Attorney, Agent, or Firm — Huawei Technologies Co., Ltd.

(57) ABSTRACT

The present application provides a method for adjusting resource configuration, a radio network controller, and a base station. The method includes sending configuration information of an uplink common enhanced dedicated transport channel E-DCH resource pool to a base station, where the configuration information of an uplink common E-DCH resource pool includes information of a first resource pool to which a first transmission time interval corresponds and information of a second resource pool to which a second transmission time interval corresponds. Indication information is sent by the base station according to usage of at least one of the resource pools. Configuration of the first resource pool can be adjusted according to the indication information. In embodiments of the present application, the range of the (Continued)

resource pool can be dynamically adjusted in the case that a plurality of transmission time intervals coexists.

19 Claims, 6 Drawing Sheets

(56) References Cited

U.S. PATENT DOCUMENTS

| | | | |
|---|---|---|---|
| 8,706,123 B2* | 4/2014 | Sambhwani | H04W 28/16 370/252 |
| 8,780,822 B2* | 7/2014 | Ma | H04W 72/042 370/329 |
| 2004/0160925 A1 | 8/2004 | Heo et al. | |
| 2007/0223495 A1 | 9/2007 | Fukui | |
| 2009/0238090 A1 | 9/2009 | Sambhwani et al. | |
| 2011/0096677 A1 | 4/2011 | Kim | |
| 2011/0149781 A1 | 6/2011 | Zhou et al. | |
| 2012/0250644 A1* | 10/2012 | Sambhwani | H04W 72/0413 370/329 |

FOREIGN PATENT DOCUMENTS

| | | | |
|---|---|---|---|
| CN | 101179361 A | 5/2008 | |
| CN | 101547510 A | 9/2009 | |
| CN | 102045727 A | 5/2011 | |
| EP | 1881620 A1 | 1/2008 | |
| EP | 2037614 A2 | 3/2009 | |
| WO | 9957924 A1 | 11/1999 | |
| WO | 03088702 A1 | 10/2003 | |
| WO | 2005125226 A2 | 12/2005 | |

OTHER PUBLICATIONS

3GPP TS 25.304 V10.4.0; 3rd Generation Partnership Project; Technical Specification Group Radio Access Network; User Equipment (UE) procedures in idle mode and procedures for cell reselection in connected mode (Release 10); Mar. 2012; total 52 pages.

3GPP TS 25.433 V11.0.0; 3rd Generation Partnership Project; Technical Specification Group Radio Access Network; UTRAN Iub interface Node B Application Part (NBAP) signalling (Release 11); Dec. 2011; total 1285 pages.

3GPP TSG RAN WG2 #77bis R2-121809, "Considerations on the open issues for 2ms and 10ms concurrent deployment in CELL FACH state", Huawei et al., Mar. 26-30, 2012, total 3 pages.

3GPP TSG-RAN2 Meeting #81 R2-130346,"Introduction of EF-FACH subfeature concurrent deployment of 2ms and 10ms TTI in a cell", Huawei et al., Change Request 25.302 V11.2.0, Jan. 28-Feb. 1, 2013, total 3 pages.

3GPP TSG RAN WG3 #76 R3-121008, "Analysis on common E-DCH resources adjustment for CELL_FACH", Huawei, May 21-25, 2012, total 3 pages.

3GPP TSG RAN WG3 #77 R3-121581, "Analysis on common E-DCH resources adjustment for CELL_FACH", Huawei, Aug. 13-17, 2012, total 4 pages.

* cited by examiner

METHOD FOR ADJUSTING RESOURCE CONFIGURATION, RADIO NETWORK CONTROLLER, AND BASE STATION

CROSS-REFERENCE TO RELATED APPLICATIONS

This application is a continuation of International Application No. PCT/CN2012/077703, filed on Jun. 28, 2012, which is hereby incorporated by reference in its entirety.

TECHNICAL FIELD

The present application relates to the field of communications, and in particular, to a method for adjusting resource configuration, a radio network controller, and a base station.

BACKGROUND

In 3rd Generation Partnership Project (3GPP) Universal Mobile Telecommunication System (UMTS) R8 version, for a user equipment (UE) in idle mode or in the forward random access channel (CELL FACH) state, in order to decrease an uplink transmission delay and improve an uplink transmission rate, an enhanced random access channel (RACH) is introduced, that is, an enhanced dedicated transport channel (E-DCH) substitutes for an RACH to implement uplink transmission.

A radio network controller (RNC) may configure an uplink transmission common enhanced dedicated transport channel (Common E-DCH) resource pool for a base station (NodeB). For example, the resource pool may have 32 sets of resources, where resource indexes (index) 1 to 32 are used to represent corresponding resources. The base station may allocate a common E-DCH resource to a user equipment according to the common E-DCH resource pool configured by the radio network controller.

The radio network controller configures two information elements (IE), Granted E-DCH Resources and Denied E-DCH Resources, on an Iub interface. The Granted E-DCH Resources are used to collect statistics on the number of E-DCH resources that are granted to a user equipment in a cell of the base station within a certain period. The Denied E-DCH Resources are used to collect statistics on the number of RACH preambles (preamble) that are detected at the base station but are denied to be allocated an E-DCH resource within a predefined period. The base station may report statistic values of the number of Granted E-DCH Resources and the number of Denied E-DCH Resources to the radio network controller in a mode set by the radio network controller, such as, periodic report, event triggered report, or on demand report. The radio network controller adjusts, according to the two statistic values, the number of common E-DCH resources configured for the cell.

The 3GPP UMTS R11 version introduces the feature that a 2 ms transmission time interval (TTI) and a 10 ms TTI coexist, that is, each cell is configured with two TTI lengths. In a same cell, a user equipment that supports an enhanced RACH, when performing uplink transmission, may dynamically select either of the two TTI lengths to perform uplink transmission. In this case, the user equipment may select a common E-DCH resource to which the 10 ms TTI corresponds or a common E-DCH resource to which the 2 ms TTI corresponds to perform uplink transmission. Because user equipments in a cell that select different TTI to perform uplink transmission change dynamically, how to dynamically adjust the range (or size) of a resource pool in the case that a plurality of TTI coexists is an urgent problem to be solved.

SUMMARY

The present application provides a method for adjusting resource configuration, a radio network controller, and a base station, which can dynamically adjust the range of a resource pool in the case that a plurality of transmission time intervals (TTIs) coexist.

In one aspect, a method for adjusting resource configuration is provided. The method includes: sending configuration information of an uplink common enhanced dedicated transport channel (E-DCH) resource pool to a base station, where the configuration information of an uplink common E-DCH resource pool includes information of a first resource pool to which a first transmission time interval corresponds and information of a second resource pool to which a second transmission time interval corresponds; receiving indication information that the base station sends according to usage of at least one of the first and second resource pools; and adjusting configuration of the first resource pool according to the indication information.

In another aspect, a method for adjusting resource configuration is provided. The method includes: receiving configuration information of an uplink common enhanced dedicated transport channel (E-DCH) resource pool sent by a radio network controller, where the configuration information of an uplink common E-DCH resource pool includes information of a first resource pool to which a first transmission time interval corresponds and information of a second resource pool to which a second transmission time interval corresponds; and sending indication information to the radio network controller according to resource usage of at least one of the first and second resource pools, where the indication information is used by the radio network controller for adjusting configuration of a resource of the first resource pool.

In still another aspect, a radio network controller is provided. The radio network controller includes: a transmitter, configured to send configuration information of an uplink common enhanced dedicated transport channel E-DCH resource pool to a base station, where the configuration information of an uplink common E-DCH resource pool includes information of a first resource pool to which a first transmission time interval corresponds and information of a second resource pool to which a second transmission time interval corresponds; a receiver, configured to receive indication information that the base station sends according to usage of at least one of the first and second resource pools; and an adjustment processor, configured to adjust configuration of the first resource pool according to the indication information.

In yet another aspect, a base station is provided. The base station includes: a receiver, configured to receive configuration information of an uplink common enhanced dedicated transport channel E-DCH resource pool sent by a radio network controller, where the configuration information of an uplink common E-DCH resource pool includes information of a first resource pool to which a first transmission time interval corresponds and information of a second resource pool to which a second transmission time interval corresponds; and a transmitter, configured to send indication information to the radio network controller according to resource usage of at least one of the first and second resource pools, where the indication information is used by the radio network controller for adjusting configuration of a resource of the first resource pool.

In the embodiments of the present application, the radio network controller receives the indication information that the base station sends according to the resource usage of the first and second resource pools to which different transmission time intervals correspond, so as to adjust configuration of a resource of one of the first and second resource pools according to the indication information, so that the range of the resource pool can be dynamically adjusted in the case that a plurality of transmission time intervals coexists.

BRIEF DESCRIPTION OF DRAWINGS

To illustrate the technical solutions in the embodiments of the present application more clearly, the following briefly describes the accompanying drawings required for describing the embodiments or the prior art. Apparently, the accompanying drawings merely show some embodiments of the present application, and persons of ordinary skill in the art can derive other drawings from these accompanying drawings without creative efforts.

DESCRIPTION OF EMBODIMENTS

Figure 1:
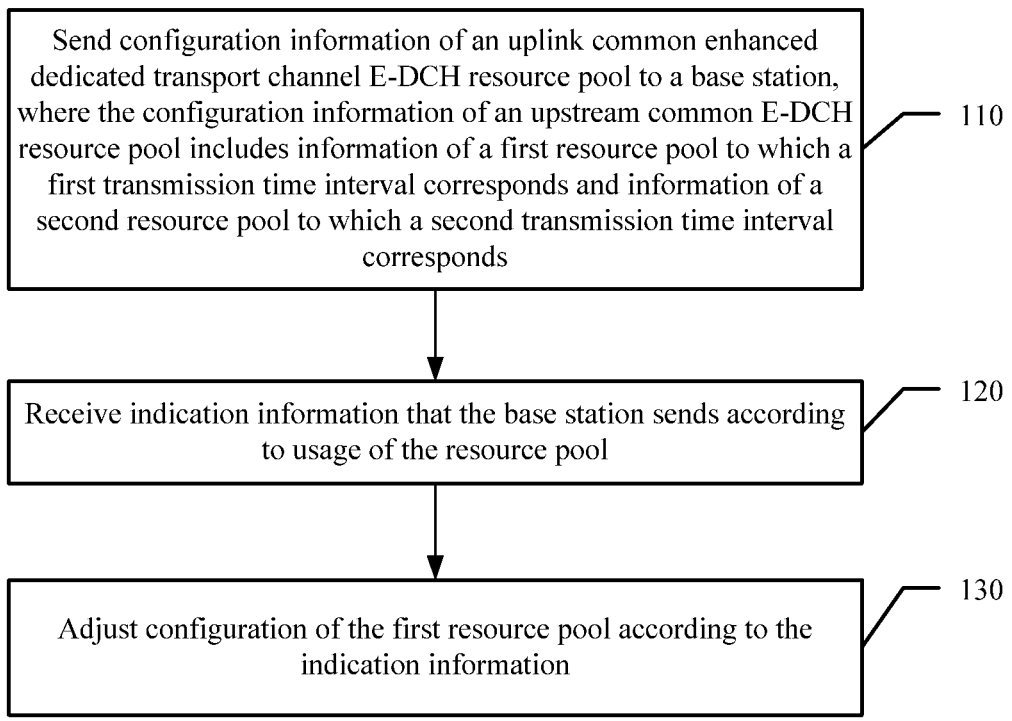
FIG. 1 is a schematic flowchart of a method for adjusting resource configuration according to an embodiment of the present application.

The following clearly and describes the technical solutions in the embodiments of the present application with reference to the accompanying drawings in the embodiments of the present application. The described embodiments are illustrative and are not to be construed as limiting the scope of the present application. All variations and modifications of the disclosed embodiments are to be interpreted as being encompassed by the scope of protection scope of the present application.

It should be understood that, the technical solutions of the present application may be applied to various communication systems, for example, a GSM (Global System of Mobile communications) system, a CDMA (Code Division Multiple Access) system, a WCDMA (Wideband Code Division Multiple Access) system, a GPRS (General Packet Radio Service) system, an LTE (Long Term Evolution) system, an LTE-A (Advanced Long Term Evolution) system, a UMTS (Universal Mobile Telecommunication System) and the like, which are not limited in the embodiments of the present application; however, for the convenience of description, the embodiments of the present application are illustrated by using a WCDMA system as an example.

The embodiments of the present application may be used in radio networks with different standards. A radio access network may include different network elements in different systems. For example, network elements of a radio access network in LTE or LTE-A include an eNB (evolved base station), and network elements of a radio access network in WCDMA include an RNC (radio network controller) and a Node B. Similarly, other radio networks, such as WiMax (Worldwide Interoperability for Microwave Access), may also use solutions similar to the embodiments of the present application, except that relevant modules in the base station system may be different, which are not limited in the embodiments of the present application; however, for the convenience of description, the following embodiments are illustrated by using a Node B as an example.

It should be further understood that, in the embodiments of the present application, a user equipment (UE) includes but is not limited to a mobile station (MS), a mobile terminal, a mobile telephone, a handset, and a portable equipment; the user equipment may communicate with one or more core networks through a radio access network (RAN). For example, the user equipment may be a mobile telephone (also called a cellular telephone), a computer with a radio communication function, and so on; the user equipment may also be a portable, pocket, handheld mobile device, or a mobile device built in a computer or mounted in a vehicle.

In addition, the terms "system" and "network" in this document are often exchangeable in use in this document. The term "and/or" in this document is only an association relationship describing associated objects, and represents that three relationships may exist. For example, A and/or B may represent the three cases: Only A exists, both A and B exist, and only B exists. In addition, the symbol "/" in this document usually represents that associated objects before and after the symbol are in an or relationship.

In R11 version, in the case that a 2 ms TTI and a 10 ms TTI coexist, a radio network controller may divide, by configuring an E-DCH resource index in a broadcast message, a common E-DCH general resource pool into two parts: part 1 and part 2, so that a user equipment that selects the 2 ms TTI is capable of using the resource pool of part 1 or part 2, which is called a sub-resource pool. Part 1 may include all common E-DCH resources corresponding to start from a common E-DCH resource index=0 to the E-DCH resource index configured by the radio network controller, and may also include all common E-DCH resources corresponding to start from a common E-DCH resource index=1 to a previous resource index of the E-DCH resource index configured by the radio network controller. Part 2 may include all common E-DCH resources corresponding to start from a common E-DCH resource index is equal to the E-DCH resource index configured by the radio network controller adding 1 to the last common E-DCH resource index, and may also include common E-DCH all resources corresponding to start from the E-DCH resource index configured by the radio network controller to the last common E-DCH resource index of the common E-DCH resource pool. A resource used by a user equipment that selects the 10 ms TTI is the same as a common E-DCH resource configured for a user equipment in R8 version, and is called a general resource pool (part 1+part 2, that is, a user equipment in R8 version and a user equipment that selects the 10 ms TTI can also use the sub-resource pool to which the 2 ms TTI corresponds). If a base station wants a user equipment to use the 10 ms TTI to perform uplink transmission due to a cause such as that the sub-resource pool to which the 2 ms TTI corresponds is insufficient, the base station may select an index of a resource from a non-2 ms-TTI resource pool and send the index to the user equipment when allocating a resource to the user equipment by using an acquisition indication channel (AICH). For example, it is assumed that the sub-resource pool to which the 2 ms TTI corresponds is part 1; the base station selects an index from part 2 and sends the index to the user equipment; the user equipment may know, after receiving the index, that the base station requires it to use the 10 ms TTI to perform uplink transmission; therefore, in the subsequent uplink transmission process, the user equipment uses the 10 ms TTI to send data.

In addition, in R11 version, after the feature that the 2 ms TTI and the 10 ms TTI coexist is introduced, the existing 16 signatures (Signature) may be divided into three parts, that is, signatures used by RACH access in R99 version, signatures used by enhanced RACH access in the 10 ms TTI of R8 version and enhanced RACH access in the 10 ms TTI of R11 version, and signatures used by enhanced RACH access in the 2 ms TTI of R11 version. Resources and signatures at the radio network controller side have a mapping relationship. When a base station receives from a user equipment a random access preamble that contains a signature, the base station may know, according to the signature, whether the user equipment selects the 10 ms TTI to perform uplink transmission or selects the 2 ms TTI to perform uplink transmission.

Based on the way for dividing the 2 ms TTI resource pool and the 10 ms TTI resource pool in R11 version and that a Node B reports statistic information of an enhanced RACH to a radio network controller in current R8 version, the radio network controller cannot adjust the range of a sub-resource pool. The present application provides a new solution for instructing, according to usage of the sub-resource pool to which the 2 ms TTI corresponds, a radio network controller to adjust the sub-resource pool to which the 2 ms TTI corresponds, to solve the problem that a radio network controller cannot adjust the range or proportion of a resource pool. Reference to "radio network controller" in the context of the embodiments of the present application is understood to mean not only dedicated (i.e., specialized) components operable to provide radio network controller functionality, but also components that provide such functionality in addition to other types of functionality.

FIG. 1 is a schematic flowchart of a method for adjusting resource configuration according to an embodiment of the present application. The embodiment in FIG. 1 is executed by a radio network controller.

110: Send configuration information of an uplink E-DCH resource pool to a base station, where the configuration information of an uplink common E-DCH resource pool includes information of a first resource pool to which a first transmission time interval corresponds and information of a second resource pool to which a second transmission time interval corresponds.

For example, the configuration information of an uplink common E-DCH resource pool is used to indicate a common E-DCH resources (for example, may be indicated by a resource index) that can be configured for the first resource pool to which the first transmission time interval (for example, 2 ms TTI) corresponds, and/or indicate a common E-DCH resource that can be configured for the second resource pool to which the second transmission time interval (for example, 10 ms TTI) corresponds, where the first resource pool (also called a sub-resource pool) may be a subset of the second resource pool (also called a general resource pool), which means that a resource in the first resource pool may be used for the first transmission time interval and may also be used for the second transmission time interval.

After obtaining the configuration information of the first resource pool and the second resource pool from the radio network controller, the base station may allocate, to a user equipment according to the configuration information when the user equipment in a current cell performs enhanced RACH access, a common E-DCH resource for uplink transmission. For example, the user equipment may send the base station an enhanced RACH preamble carrying a signature to which the first transmission time interval corresponds, to select the first transmission time interval to perform uplink transmission. After receiving the enhanced RACH preamble, the base station may select a common E-DCH resource from the first resource pool to which the first transmission time interval corresponds and allocate the common E-DCH resource to the user equipment, that is, may grant the user equipment to use the first transmission time interval to perform uplink transmission, and notify the user equipment by using an AICH channel that a common E-DCH resource to which the first transmission time interval corresponds may be used to perform uplink transmission; or, the base station may authorize, as needed (for example, all common E-DCH resources to which the first transmission time interval corresponds have been occupied), the user equipment to use the second transmission time interval to perform uplink transmission, that is, the first transmission time interval is changed to (is replaced with, is switched to) the second transmission time interval, and the base station notifies the user equipment by using an AICH channel that a common E-DCH resource to which the second transmission time interval corresponds may be used to perform uplink transmission. Certainly, the base station may reject a random access request of a user equipment, that is, may not allocate any common E-DCH resource to the user equipment.

120: Receive indication information that the base station sends according to usage of the resource pool.

The usage of the resource pool includes usage of the first resource pool and/or usage of the second resource pool, that is, the user equipment is authorized, or denied, or switched when selecting the first transmission time interval or the second transmission time interval to perform uplink transmission. Statistics on the usage of the resource pool may be collected by the base station in the random access process of the user equipment. The base station may report collected usage of the resource pool to the radio network controller through the indication information. Optionally, the base station may determine an adjustment mode for configuration of the resource pool according to the collected usage of the resource pool, and enable the adjustment mode to be contained in the indication information to send to the radio network controller.

130: Adjust configuration of the first resource pool according to the indication information.

After receiving the indication information, the radio network controller may adjust configuration of the resource pool according to the indication information. For example, when the indication information contains usage of the resource pool, the radio network controller may determine an adjustment mode for configuration of the resource pool according to the usage of the resource pool, and adjust the configuration of the resource pool according to the adjustment mode.

For another example, when the indication information contains an adjustment mode for configuration of the resource pool, the radio network controller may perform adjustment on the configuration of the resource pool directly according to the adjustment mode.

It should be understood that, the adjustment may include increasing or decreasing the range of the resource pool. It should be further understood that, the first transmission time interval and the second transmission time interval defined in the embodiments of the present application are only for the convenience of description, and embodiments according to the present application are not limited to two types of transmission time intervals, for example, except the 2 ms TTI and 10 ms TTI, 5 ms TTI, 20 ms TTI, and so on may be further included.

In an embodiment of the present application, the radio network controller may receive the indication information that the base station sends according to the resource usage of the resource pools to which different transmission time intervals correspond, so as to adjust configuration of a resource of a resource pool according to the indication information, so that the range of the resource pool can be dynamically adjusted in the case that a plurality of transmission time intervals coexists.

According to an embodiment of the present application, the indication information includes usage of the resource pool, used for determining an adjustment mode for configuration of the first resource pool, where the usage of the resource pool includes at least one of the following statistic information: statistic information of a granted resource of the first resource pool, statistic information of resource switching between the first resource pool and the second resource pool, and statistic information of a denied resource of the first resource pool.

For example, the usage of the resource pool may include statistic information of usage of a resource in the first resource pool within a predefined time (for example, 20 ms or one frame) when a user equipment performs enhanced RACH access. For example, the statistic information of a granted resource in the first resource pool may include the number of resources in the first resource pool that are granted to the user equipment, the statistic information of resource switching between the first resource pool and the second resource pool may include the number of user equipments that select the first transmission time interval to perform uplink transmission but are authorized to use the second transmission time interval to perform uplink transmission (that is, in accordance with preferred use of a resource in the first resource pool to perform uplink transmission and are authorized to use a resource in the second resource pool to perform uplink transmission, and so on). The statistic information of a denied resource of the first resource pool may include the number of user equipments that select the first transmission time interval to perform uplink transmission but are denied (that is, in accordance with preferred use of the first transmission time interval to perform uplink transmission but are denied).

According to an embodiment of the present application, the indication information is a common measurement result, where the statistic information of resource switching contains: within a predefined time, the number of user equipments that perform random access, and select the first transmission time interval to perform uplink transmission, but are authorized to use the second transmission time interval to perform uplink transmission; where the method further includes: sending a common measurement initialization request to the base station, where the common measurement initialization request is used for requesting the base station to report the common measurement result.

According to a further embodiment of the present application, the common measurement initialization request includes: a first preset threshold value, used for instructing the base station to report the common measurement result when the number of resource switching included in the statistic information of resource switching is greater than the first preset threshold value.

In 130, in the case that the number contained in the statistic information of resource switching is greater than a second preset threshold, the range of the first resource pool may be increased; where the method further includes: sending a reconfiguration request used for increasing the range of the first resource pool to the base station.

For example, the second preset threshold is used for indicating that the number contained in the statistic information of resource switching is so large that the range of the first resource pool needs to be increased; for example, the second preset threshold may be set to 10% which is a percentage to the number of resources in the first resource pool.

According to yet a further embodiment of the present invention, the statistic information of a granted resource of the first resource pool contains: within the predefined time, the number of resources that the base station grants to a user equipment that uses the first transmission time interval to perform uplink transmission; the statistic information of a denied resource of the first resource pool contains: within the predefined time, the number of random access channel preambles that are detected at the base station but are denied to be allocated a common E-DCH resource of the first resource pool.

Optionally, as another embodiment, in the case that the number contained in the statistic information of a granted resource of the first resource pool is greater than a third preset threshold or reaches the total number of resources of the first resource pool configured for the cell where the user equipment is located, the range of the first resource pool may be increased and a reconfiguration request used for increasing the range of the first resource pool may be further sent to the base station.

In this case, because most of or all resources of the first resource pool have been used, the number of resources in the first resource pool needs to be increased. For example, the third preset threshold is used for indicating that the number contained in the statistic information of a granted resource of the first resource pool is so large that the range of the first resource pool needs to be increased. For example, the third preset threshold may be set to that a percentage to the total number of resources in the first resource pool is greater than 90%.

Optionally, as another embodiment, in the case that the number contained in the statistic information of resource switching is greater than zero, the range of the first resource pool may be increased, and a reconfiguration request used for increasing the range of the first resource pool may be further sent to the base station.

When the number contained in the statistic information of resource switching is greater than zero, it also indicates that resources of the first resource pool may be insufficient, and therefore, the number of resources in the first resource pool may be added.

Optionally, as another embodiment, in the case that the number contained in the statistic information of resource switching is greater than zero and the number contained in the statistic information of a granted resource of the first resource pool reaches the total number of resources in the first resource pool configured for the cell, the range of the first resource pool may be increased and a reconfiguration request used for increasing the range of the first resource pool may be further sent to the base station.

Because that the number contained in the statistic information of resource switching is greater than zero and the number contained in the statistic information of a granted resource of the first resource pool reaches the total number of resources in the first resource pool configured for the cell indicates that resources in the first resource pool are insufficient, the number of resources in the first resource pool needs to be increased.

Optionally, as another embodiment, in the case that the statistic information of a denied resource of the first resource pool is greater than a fourth preset threshold, the range of the first resource pool may be increased and a reconfiguration request used for increasing the range of the first resource range may be further sent to the base station.

Optionally, as another embodiment, the indication information further includes: statistic information of a denied resource, where the statistic information of a denied resource includes: the number of random access channel preambles that are detected at the base station but are denied to be allocated a common E-DCH resource within the predefined time but are denied to be allocated a common E-DCH resource within the predefined time; the indication information is further used for instructing to adjust configuration of the second resource pool, where the method in FIG. 1 further includes: in the case that the number contained in the statistic information of a denied resource is greater than a fifth preset threshold, increasing the range of the second resource pool and sending a reconfiguration request used for increasing the range of the second resource pool to the base station.

For example, the fifth preset threshold indicates that the number contained in the statistic information of a denied resource is so large that the number of resources in the second resource pools needs to be increased; for example, the fifth preset threshold may be set to that a percentage to the total number of resources in the second resource pool is greater than 10%.

Optionally, as another embodiment, the indication information includes: adjustment indication information of the resource pool, used for indicating an adjustment mode for configuration of the first resource pool. The radio network controller may adjust configuration of the first resource pool directly according to the adjustment indication information.

According to a further embodiment of the present application, the adjustment indication information of the resource pool includes: the number of resources in the first resource pool that are required by the base station and the number of resources in the second resource pool that are required by the base station.

Optionally, as another embodiment, the adjustment indication information of the resource pool includes: the number of resources in the first resource pool that are required by the base station, and a proportion relationship between the number of resources in the first resource pool that are required by the base station and the number of resources in the second resource pool that are required by the base station.

Optionally, as another embodiment, the adjustment indication information of the resource pool includes: the number of resources in the second resource pool that are required by the base station, and a proportion relationship between the number of resources in the first resource pool that are required by the base station and the number of resources in the second resource pool that are required by the base station.

Optionally, as another embodiment, the adjustment indication information of the resource pool includes: an index of the resource.

The forgoing index of the resource contained in the adjustment indication information may be used to indicate the range of the first resource pool. For example, the second resource pool includes indexes of 32 resources; if the adjustment indication information contains a value 15, it indicates that the first resource pool includes resources with indexes being from 0 to 15.

Optionally, as another embodiment, the adjustment indication information of the resource pool includes: an increment of the number of resources in the first resource pool that is required by the base station.

For example, if the current number of resources of the first resource pool is 16 and the increment carried in the adjustment indication information is 4, it indicates that the number of resources of the first resource pool that is required by the base station is 20.

Optionally, as another embodiment, the indication information further includes: adjustment indication information of a signature, used for indicating an adjustment mode for configuration of the signature, where the method further includes: adjusting, according to the adjustment indication information of a signature, the range of a signature used by the user equipment which uses the first transmission interval time to perform uplink transmission.

The base station may instruct, according to the signature adjustment indication information, the radio network controller to configure different numbers of signatures for different resource pools, for example, to allocate 5 signatures to the first resource pool and configure 8 signatures for the second resource pool.

Optionally, as another embodiment, the range of signatures used by the user equipment that uses the first transmission time interval to perform uplink transmission is adjusted according to the adjustment to the configuration of the first resource pool.

For example, when the number of resources in the first resource pool is increased, accordingly, the number of signatures may be increased.

Optionally, as another embodiment, after the configuration of the first resource pool is adjusted, the user equipment is instructed to re-read information of the first resource pool configured for the base station.

According to various embodiments of the present application, the uplink common E-DCH is used for performing uplink transmission when the user equipment is in an idle mode or a forward access channel state; the first transmission time interval includes a 2 ms transmission time interval and the second transmission time interval includes a 10 ms transmission time interval.

Figure 2:
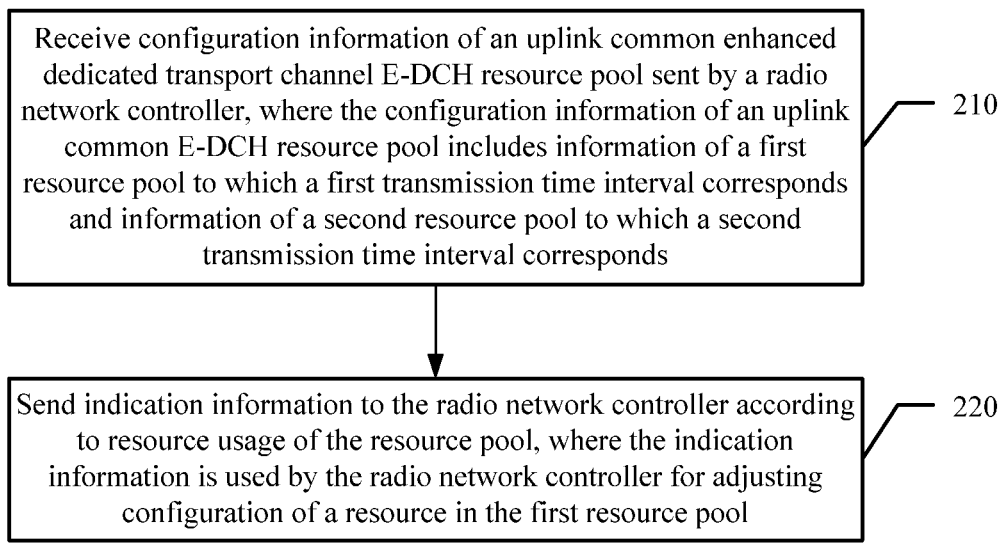
FIG. 2 is a schematic flowchart of a method for adjusting resource configuration according to another embodiment of the present application.

FIG. 2 is a schematic flowchart of a method for adjusting resource configuration according to another embodiment of the present application. An embodiment in FIG. 2 is executed by a base station and corresponds to the method in FIG. 1.

210: Receive configuration information of an uplink common enhanced dedicated transport channel E-DCH resource pool sent by a radio network controller, where the configuration information of an uplink common E-DCH resource pool includes information of a first resource pool to which a first transmission time interval corresponds and information of a second resource pool to which a second transmission time interval corresponds.

220: Send indication information to the radio network controller according to resource usage of the resource pool, where the indication information is used by the radio network controller for adjusting configuration of a resource in the first resource pool.

In an embodiment of the present application, the base station may send indication information to the radio network controller according to resource usage of resource pools to which different transmission time intervals correspond, so that the radio network controller may adjust configuration of a resource of a resource pool, and the range of a resource pool can be dynamically adjusted in the case that a plurality of TTI coexists.

According to an embodiment of the present application, the indication information includes usage of the resource pool, used for instructing the radio network controller to determine an adjustment mode for configuration of the first resource pool according to the usage of the resource pool, where the usage of the resource pool includes at least one of the following statistic information: statistic information of a granted resource of the first resource pool, statistic information of resource switching between the first resource pool and the second resource pool, and statistic information of a denied resource of the first resource pool.

According to a further embodiment of the present application, the indication information is a common measurement result; the statistic information of resource switching contains: within a predefined time, the number of user equipments that perform random access and select the first transmission time interval to perform uplink transmission but are authorized to use the second transmission time interval to perform uplink transmission; the method in FIG. 2 further includes: receiving a common measurement initialization request from the radio network controller, where the common measurement initialization request is used for requesting reporting of the common measurement result, and in 220, the common measurement result may be reported to the radio network controller according to the common measurement request and the resource usage of the first resource pool and/or the second resource pool.

According to an embodiment of the present application, the common measurement initialization request includes: a first preset threshold, used for instructing to report the common measurement result to the radio network controller when the number contained in the statistic information of resource switching is greater than the first preset threshold.

According to another embodiment of the present application, the statistic information of a granted resource of the first resource pool contains: within the predefined time, the number of resources that are granted to a user equipment that uses the first transmission time interval to perform uplink transmission; the statistic information of a denied resource of the first resource pool contains: within the predefined time, the number of random access channel preambles that are detected at the base station but are denied to be allocated a common E-DCH resource of the first resource pool.

Optionally, as another embodiment, receiving a reconfiguration request sent by the radio network controller and used for increasing the range of the first resource pool.

Optionally, as another embodiment, the indication information further includes: statistic information of a denied resource, where the statistic information of a denied resource contains: within the predefined time, the number of random access channel preambles that are detected at the base station but are denied to be allocated a common E-DCH resource; the indication information is further used by the radio network controller for adjusting the range of the second resource pool; where, the method in FIG. 2 further includes: receiving a reconfiguration request sent by the radio network controller and used for increasing the range of the second resource pool.

According to an embodiment of the present application, the indication information includes: adjustment indication information of the resource, used for indicating an adjustment mode for configuration of the first resource pool.

According to an embodiment of the present application, the adjustment indication information of the resource includes: the number of resources in the first resource pool that are required by the base station and the number of resources in the second resource pool that are required by the base station, or the number of resources in the first resource pool that are required by the base station and a proportion relationship between the number of resources in the first resource pool that are required by the base station and the number of resources in the second resource pool that are required by the base station, or the number of resources in the second resource pool that are required by the base station and a proportion relationship between the number of resources in the first resource pool that are required by the base station and the number of resources in the second resource pool that are required by the base station, or an index of the resource, or an increment of the number of resources in the second resource pool that is required by the base station.

Optionally, as another embodiment, the indication information further includes: adjustment indication information of a signature, used for indicating an adjustment mode for configuration of the signature; where the method in FIG. 2 further includes: receiving a reconfiguration request sent by the radio network controller and used for increasing the range of the signature.

According to an embodiment of the present application, the uplink common E-DCH is used for performing uplink transmission in an idle mode or a forward access channel state of the user equipment, where the first transmission time interval includes a 2 ms transmission time interval and the second transmission time interval includes a 10 ms transmission time interval.

It should be understood that, the forgoing message may use a format of dedicated signaling and may also be carried in common information.

The following describes embodiments of the present invention in more detail in combination with specific examples.

Figure 3:
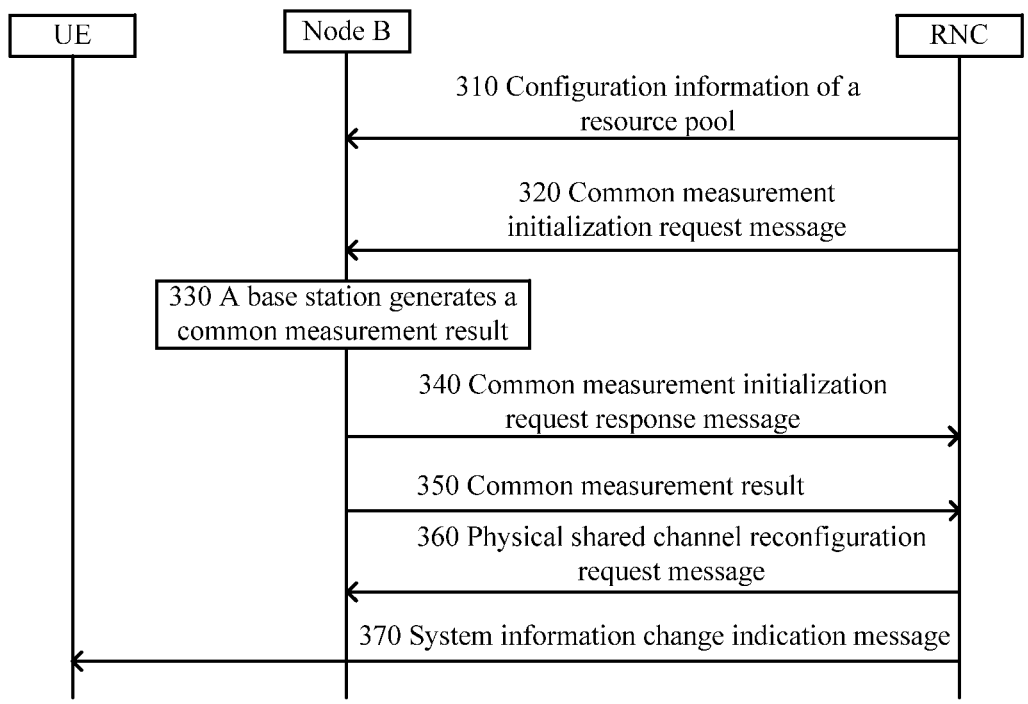
FIG. 3 is a schematic flowchart of a process of adjusting resource configuration according to an embodiment of the present application.

FIG. 3 is a schematic flowchart of a process of adjusting resource configuration according to an embodiment of the present application.

310: A radio network controller (for example, RNC) sends configuration information of a resource pool to a base station (for example, Node B).

For example, the radio network controller may send configuration information of an uplink common E-DCH resource pool to the base station, where the configuration information may include a 2 ms TTI and configuration information of a first resource pool (also called a sub-resource pool) to which the 2 ms TTI corresponds, and configuration information of a second resource pool (also called a general resource pool) to which a 10 ms TTI corresponds. The first resource pool may be a subset of the second resource pool. For example, the base station may know, according to the configuration information, that: the first resource pool to which the 2 ms TTI corresponds includes common E-DCH resources with indexes being from 0 to 15 and the second resource pool to which the 10 ms TTI corresponds includes common E-DCH resources with indexes being from 0 to 31. It should be understood that, in the case that a plurality of TTI coexists, configuration information of a resource pool may include a plurality of TTI and configuration information of resource pools to which the plurality of TTI corresponds.

320: The radio network controller sends a common measurement initialization request (Common Measurement Initiation Request) message to the base station.

For example, the radio network controller may send the common measurement initialization request message through a control port to the base station.

The radio network controller may configure two information elements: Granted E-DCH Resources and denied E-DCH resources in the common measurement initialization request message, that is, a common measurement type of the common measurement initialization request message contains Granted E-DCH Resources and Denied E-DCH Resources.

In an embodiment of the present application, the common measurement type of the common measurement initialization request message is further configured with statistic information of resource switching between the first resource pool and the second resource pool, that is, a statistic value of the number of the 2 ms TTI being changed to (replaced with, switched to) the 10 ms TTI. The statistic value may be defined as: within a predefined time, the number of user equipments (for example, UE) that perform random access and select the 2 ms TTI to perform uplink transmission but are authorized to use the 10 ms TTI to perform uplink transmission. In other words, the statistic value may be defined as a statistic value of the number of such user equipments, that is, within the present time, these user equipments select, when performing random access (for example, the forgoing enhanced RACH access), a 2 ms TTI preamble signature (that is, an random access preamble contains a preamble signature to which the 2 ms TTI corresponds), but the base station sends, after detecting the random access preamble, an index of a resource to which the 10 ms TTI corresponds to these user equipments through an AICH, to authorize to change (replace or switch) the 2 ms TTI to the 10 ms TTI.

In addition, a measurement threshold and a measurement increase/decrease threshold of the common measurement initialization request message contain Denied E-DCH Resources and/or the 2 ms TTI being changed to (replaced with, switched to) the 10 ms TTI, and a threshold of Denied E-DCH Resources and a threshold of the 2 ms TTI being changed to (replaced with, switched to) the 10 ms TTI. The radio network controller determines, according to the number of currently configured resources, a predictive value of the statistic value of the number of Denied E-DCH Resources and/or the number of the 2 ms TTI being changed to (replaced with, switched to) the 10 ms TTI, that is, predicts that in which range the number of Denied E-DCH Resources and/or the number of the 2 ms TTI being changed to (replaced with, switched to) the 10 ms TTI is reasonable, and therefore presets the forgoing thresholds according to the predictive value. For example, it is assumed that the number of resources of the first resource pools is 10; if the radio network controller predicts that the reasonable number of the 2 ms TTI being changed to (replaced with, switched to) the 10 ms TTI is 2, the threshold of the 2 ms TTI being changed to (replaced with, switched to) the 10 ms TTI is set to 2; it is assumed that the number of the second resource pools is 20; if the radio network controller predicts that the reasonable number of the 2 ms TTI being changed to (replaced with, switched to) the 10 ms TTI is 5, the threshold of the 2 ms TTI being changed to (replaced with, switched to) the 10 ms TTI is set to 5.

330: The base station generates a common measurement result.

For example, the base station may initialize a requested measurement according to a parameter contained in the common measurement initialization request message, in other words, collects statistics on usage of a resource in a resource pool. The base station may measure usage of a resource in a resource pool within a specified time (for example, 20 ms), so as to generate a common measurement result according to the usage of the resource of the resource pool. Usage of a resource of a resource pool may be a statistic value of the number of the 2 ms TTI being changed to (replaced with, switched to) the 10 ms TTI, a statistic value of the number of Granted E-DCH Resources, and a statistic value of the number of Denied E-DCH Resources. The common measurement result may contain the forgoing resource usage of a resource pool.

340: The base station sends the radio network controller a common measurement initialization response message.

For example, after receiving the common measurement initialization request message, the base station, if capable of initializing the measurement required by the radio network controller, may send the common measurement initialization response message to the radio network controller, and carry the common measurement result in the common measurement response message as needed (that is, reporting the common measurement result as needed by the radio network controller).

350: The base station sends the common measurement result to the radio network controller through a common measurement report message. It should be understood that 350 is optional.

The base station may send the common measurement report message to the radio network controller according to a report mode set by the radio network controller. The report mode may be periodic report, event triggered report, or the radio network controller sending a message to request the base station to report (that is on demand report), and so on.

For example, for the event triggered report mode, the radio network controller may set a threshold to trigger the base station to report a statistic value of the number of Denied E-DCH Resources, that is, after the statistic value of the number of Denied E-DCH Resources exceeds the preset threshold and/or the statistic value of the number of the 2 ms TTI being changed to (replaced with, switched to) the 10 ms TTI exceeds another preset threshold, the base station is triggered to report the statistic value, and the base station may simultaneously report the number of the 2 ms TTI being changed to (replaced with, switched to) the 10 ms TTI, the statistic value of the number of Granted E-DCH Resources, and the statistic value of the number of Denied E-DCH Resources (that is, event triggered report).

360: The radio network controller adjusts ranges of the first resource pool, the second resource pool, and the signature, and sends a physical shared channel reconfiguration request message to the user equipment.

For example, after adjusting the configuration of a common E-DCH resource (for example, the configuration of the first resource pool, the second resource pool, and the signature) according to the forgoing common measurement result, the radio network controller may inform the base station of configuration information of the adjusted first resource pool, second resource pool, and signature by using the physical shared channel reconfiguration request message. For example, the radio network controller may dynamically adjust the range of the first resource pool according to the statistic value of the number of the 2 ms TTI being changed to (replaced with, switched to) the 10 ms TTI, and may further adjust the range of the second resource pool according to the statistic value of the number of Denied E-DCH Resources and/or the statistic value of the number of Granted E-DCH Resources. For example, specifically, a resource adjustment mode is as follows:

When the statistic value of the number of Denied E-DCH Resources is very small (for example, smaller than the preset threshold) and the number of the 2 ms TTI being changed to (replaced with, switched to) the 10 ms TTI is very large (for example, greater than the preset threshold), it indicates that the second resource pool is sufficient but the first resource pool is insufficient, and therefore, the radio network controller needs to increase the proportion of the first resource pool; in addition, the radio network controller may increase, according to the increase of the number of resources to which the 2 ms TTI corresponds, the number of signatures to which the 2 ms TTI corresponds.

When the statistic value of the number of Denied E-DCH Resources is very small and the number of the 2 ms TTI being changed to (replaced with, switched to) the 10 ms TTI is also very small (for example, smaller than the preset threshold), it indicates that the second resource pool is sufficient and the first resource pool is sufficient, and the first resource pool does not need to be adjusted.

When the statistic value of the number of Denied E-DCH Resources is very large (for example, greater than the preset threshold) and the number of the 2 ms TTI being changed to (replaced with, switched to) the 10 ms TTI is also very large, it indicates that the second resource pool is insufficient and the first resource pool is also insufficient, and therefore, the ranges of both the first resource pool and the second resource pool need to be increased; in addition, the radio network controller may increase, according to the increase of the statistic value of the number of resources to which the 2 ms TTI corresponds, the number of signatures to which the 2 ms TTI corresponds.

When the statistic value of the number of Denied E-DCH Resources is very large and the number of the 2 ms TTI being changed to (replaced with, switched to) the 10 ms TTI is comparatively small, it indicates that the second resource pool is insufficient and the first resource pool is sufficient, and therefore, the range of the second resource pool needs to be increased.

370: The radio network controller sends a system information change indication (System Information Change Indication) message to the user equipment.

For example, the radio network controller adjusts a broadcast message at the same time, for example, adjusts configuration information of a common E-DCH resource in the system information change indication message. The radio network controller may instruct, through the system information change indication message, the user equipment to re-obtain information of the first resource pool and the second resource pool, that is, instruct the user equipment to re-read the broadcast message to obtain configuration information of the adjusted first resource pool, second resource pool, and signature.

Figure 4:
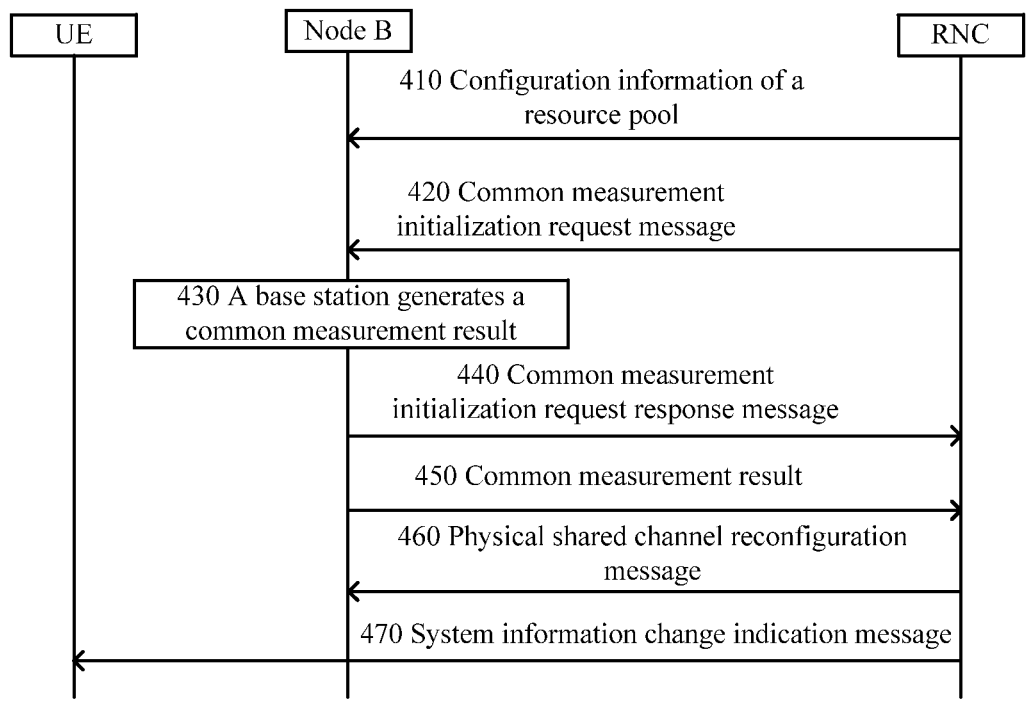
FIG. 4 is a schematic flowchart of a process of adjusting resource configuration according to another embodiment of the present application.

FIG. 4 is a schematic flowchart of a process of adjusting resource configuration according to another embodiment of the present application; 410, 430, 450, and 470 in the embodiment in FIG. 4 are similar to 310, 330, 350, and 370 in the embodiment in FIG. 3, and some details are not described here.

410: A radio network controller sends configuration information of a resource pool to a base station.

420: The radio network controller sends a common measurement initialization request message to the base station.

Different from 320 in FIG. 3, in the embodiment of the present application, a statistic value of the number of 2 ms TTI Granted E-DCH Resources may be added in a common measurement type of the common measurement initialization request message, and it is defined as: within a period of time, the number of 2 ms TTI common E-DCH resources that are granted to a 2 ms TTI user equipment (that is, a user equipment that selects the 2 ms TTI to perform uplink transmission) in Rel-11 version.

The radio network controller may dynamically adjust, according to the statistic value of the number of the 2 ms TTI being changed to (replaced with, switched to) the 10 ms TTI and the statistic value of the number of 2 ms TTI Granted E-DCH Resources, the range of a first resource pool to which the 2 ms TTI corresponds. The radio network controller may also dynamically adjust the range of a second resource pool according to the statistic value of the number of Granted E-DCH Resources and the statistic value of the number of Denied E-DCH Resources defined in R8 version.

Optionally, a statistic value of the number of 2 ms TTI Denied E-DCH resources (2 ms TTI Denied E-DCH Resources) may also be added in the common measurement type, and it is defined as: within a predefined time, the number of random access channel preambles that are detected at the base station but are denied to be allocated 2 ms TTI common E-DCH resources.

430: The base station generates a common measurement result.

For example, the base station may initialize a requested measurement according to a parameter contained in the common measurement initialization request message, in other words, collects statistics on usage of a resource in a resource pool. The base station may measure usage of a resource in a resource pool within a specified time (for example, 20 ms), so as to generate a common measurement result according to the usage of the resource of the resource pool. The usage of a resource of a resource pool may be a statistic value of the number of the 2 ms TTI being changed to (replaced with, switched to) the 10 ms TTI, a statistic value of the number of Granted E-DCH Resources, a statistic value of the number of Denied E-DCH Resources, and a statistic value of the number of 2 ms TTI Granted E-DCH Resources. Optionally, the usage of a resource in a resource pool may further includes 2 ms TTI Denied E-DCH Resources. The common measurement result may contain the forgoing resource usage of a resource pool.

440: The base station sends the radio network controller a common measurement initialization response message.

450: The base station sends the common measurement result to the radio network controller through a common measurement report message.

460: The radio network controller adjusts ranges of the first resource pool, the second resource pool, and the signature, and sends a physical shared channel reconfiguration request message to the base station.

For example, after adjusting the configuration of a common E-DCH resource (for example, the configuration of the first resource pool, the second resource pool, and the signature) according to the forgoing common measurement result, the radio network controller may inform the base station of configuration information of the adjusted first resource pool, second resource pool, and signature by using the physical shared channel reconfiguration request message. For example, the radio network controller may dynamically adjust the range of the first resource pool according to the statistic value of the number of the 2 ms TTI being changed to (replaced with, switched to) the 10 ms TTI and the statistic value of the number of 2 ms TTI Granted E-DCH Resources, and may further adjust the second resource pool according to the statistic value of the number of Denied E-DCH Resources and/or the statistic value of the number of Granted E-DCH Resources. For example, a specific resource adjustment mode is as follows:

1. The second resource pool is sufficient (for example, the statistic value of the number of Denied E-DCH Resources is smaller than a preset threshold).

When the statistic value of the number of 2 ms TTI Granted E-DCH Resources is close to or reaches the total number of resources in the first resource pool configured by the radio network controller for a current cell, or the statistic value of the number of the 2 ms TTI being changed to (replaced with, switched to) the 10 ms TTI is greater than 0 (indicating that there is a 2 ms TTI being switched to the 10 ms TTI), the radio network controller may increase the range of the first resource pool and keep the range of the second resource pool unchanged; in addition, the radio network controller may increase, according to the increase of the number of resources to which the 2 ms TTI corresponds, the number of signatures to which the 2 ms TTI corresponds.

When the statistic value of the number of 2 ms TTI Granted E-DCH Resources is normal (for example, not greater than the preset threshold) but the statistic value of the number of the 2 ms TTI being changed to (replaced with, switched to) the 10 ms TTI is greater than 0 (indicating that there is a 2 ms TTI being switched to the 10 ms TTI), it indicates that some resources to which the 2 ms TTI corresponds are configured for resources to which the 10 ms TTI correspond; in this case, the range of the first resource pool may not be adjusted (the current measurement amount reported in this scenario is comparatively accurate).

When the statistic value of the number of 2 ms TTI Granted E-DCH Resources is normal, or the number of the 2 ms TTI being changed to (replaced with, switched to) the 10 ms TTI is 0, it indicates that the first resource pool to which the 2 ms TTI corresponds is sufficient; in this case, the first resource pool to which the 2 ms TTI corresponds may not need to be adjusted.

2. When the second resource pool is insufficient (for example, the statistic value of the number of Denied E-DCH Resources is greater than the preset threshold), the radio network controller determines, according to the number of the 2 ms TTI being changed to (replaced with, switched to) the 10 ms TTI is 0, whether to adjust the range of the first resource pool.

When the statistic value of the number of 2 ms TTI being changed to (replaced with, switched to) the 10 ms TTI is equal to 0, or the statistic value of the number of 2 ms TTI Granted E-DCH Resources is very small (for example, smaller than the preset threshold), the radio network controller does not need to increase the range of the first resource pool and only increases the range of the second resource pool.

When the statistic value of the number of 2 ms TTI being changed to (replaced with, switched to) the 10 ms TTI is greater than 0 (for example, greater than the preset threshold), and the statistic value of the number of 2 ms Granted E-DCH Resources reaches the total number of resources in the first resource pools configured by the radio network controller for the current cell, the radio network controller needs to increase the ranges of both the first resource pool and the second resource pool simultaneously; in addition, the radio network controller may increase, according to the increase of the number of resources to which the 2 ms TTI corresponds, the number of signatures to which the 2 ms TTI corresponds.

When the statistic value of the number of 2 ms TTI being changed to (replaced with, switched to) the 10 ms TTI is greater than 0 (for example, greater than the preset threshold), and the statistic value of the number of 2 ms Granted E-DCH Resources is very small (for example, smaller than the preset threshold), the radio network controller does not need to increase the range of the first resource pool and separately increases the range of the second resource pool.

Optionally, when the number of random access channel preambles that are detected at the base station but are denied to be allocated a 2 ms TTI common E-DCH resource within the predefined time is greater than the preset threshold, the range of the first resource pool may be increased.

470: The radio network controller radio instructs the user equipment to re-obtain configuration information of the first resource pool and the second resource pool.

Figure 5:
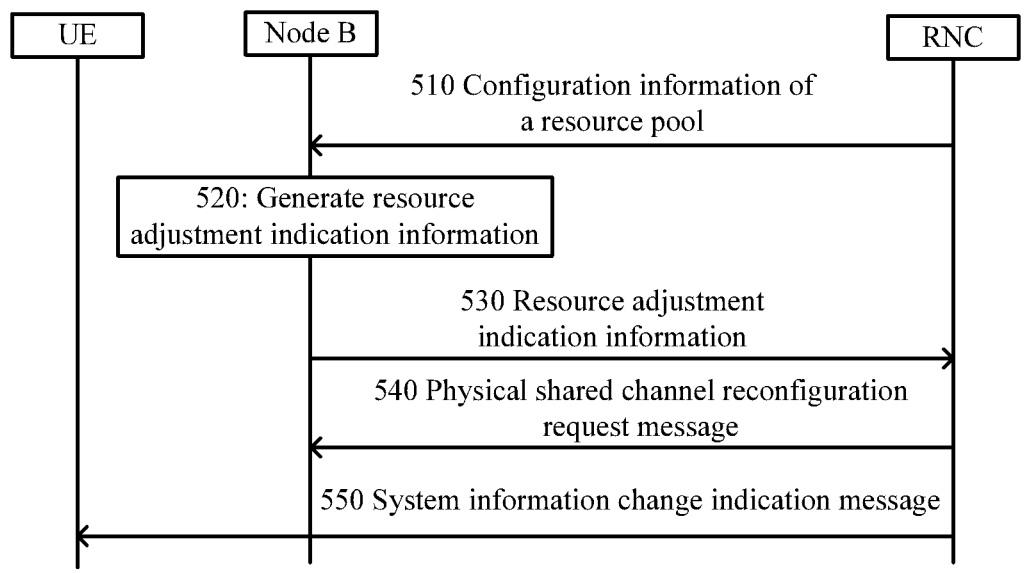
FIG. 5 is a schematic flowchart of a process of adjusting resource configuration according to still another embodiment of the present application.

FIG. 5 is a schematic flowchart of a process of adjusting resource configuration according to still another embodiment of the present application;

510: A radio network controller sends configuration information of a resource pool to a base station. 510 in FIG. 5 is similar to 310 in FIG. 3 and is not described herein again.

520: The base station generates resource adjustment indication information.

A Node B may calculate, according to usage of an R11 version 2 ms TTI resource of a cell, a usage statistic value and another statistic value of usage of a common E-DCH resource, and report, according to these statistic values, resource indication information to the radio network controller, where the resource indication information is used for instructing the radio network controller how to perform common E-DCH resource adjustment, that is, used for indicating an adjustment mode for the configuration of the first resource pool and an adjustment mode for the second resource pool.

The resource adjustment indication information may contain information of the 2 ms TTI first resource pool and the second resource pool, for example, reporting the number of required resources in each resource pool or reporting the number of required resources in the first resource pool and a proportion relationship between the two resource pools, or reporting the number of required resources in the second resource pool and a proportion relationship between the two resource pools; the resource indication information may also only include information of the resource pool to which the 2 ms TTI corresponds, for example, a resource index (or number) indicating how to divide the first resource pool to which the 2 ms TTI corresponds, or information indicating the number of resources that need to be added for the first resource pool.

Optionally, the resource adjustment indication information may further contain signature division indication information, used for indicating an adjustment mode for configuration of a signature. For example, the number of signatures to which the four parts: R99 version RACH access, R8 version enhanced RACH access, R11 version 2 ms TTI enhanced RACH access, and R11 version 10 ms TTI enhanced RACH access: correspond may be carried, or the number of signatures to which the three parts: R99 version RACH, R8 and R11 version 10 ms TTI, and R11 version 2 ms TTI: correspond are contained.

530: The base station sends the resource adjustment indication information to the radio network controller.

For example, the resource indication information may be contained in a Node B application part/radio network subsystem application part (Node B Application Part/RNS Application Part, NBAP/RNSAP) message or a data frame to be sent to the radio network controller.

540: The radio network controller adjusts ranges of the first resource pool, the second resource pool, and the signature, and sends a physical shared channel reconfiguration request message to the base station.

If the resource adjustment indication information contains the number of resources in each resource pool that are required by the base station, for example, 10 and 20, the radio network controller sets the number of resources in the first resource pools and the number of the second resource pools to 10 and 20.

If the resource adjustment indication information contains the number of resources in the first pool that are required by the base station and the proportion relationship between the two resource pools, for example, 10, and 1:2, the radio network controller sets the number of the first resource pools and the number of the second resource pools to 10 and 20.

If the resource adjustment indication information contains the number of resources in the second resource pool that are required by the base station and the proportion relationship between the two resource pools, for example, (20, and 1:2), the radio network controller sets the number of the first resource pools and the number of the second resource pools to 10 and 20.

If the resource indication information contains information of the resource pool to which the 2 ms TTI corresponds, for example, the resource index (or number) is 10, the radio network controller configures the range of the first resource pool to which the 2 ms TTI corresponds to include resources with indexes being from 0 to 9.

If the resource indication information contains information that how many resources the base station needs to add to the first resource pool, for example, 4, and the number of resources in the first resource pool before configuration adjustment is 10, the radio network controller configures the number of the first resource pools to 14, for example, indexes from 0 to 9 are adjusted to 0 to 13.

For example, after adjusting the configuration of a common E-DCH resource (for example, configuration of the first resource pool, the second resource pool, and the signature) according to the adjustment mode for the configuration of the E-DCH resource carried in the forgoing resource adjustment indication information, the radio network controller may inform the base station of configuration information of the adjusted first resource pool, second resource pool, and signature by using the physical shared channel reconfiguration request message.

550: The radio network controller sends a system information change indication message to the user equipment.

The radio network controller may adjust a broadcast message at the same time, for example, adjusts configuration information of a common E-DCH resource in the system information change indication message. The radio network controller may instruct, through the system information change indication message, the user equipment to re-obtain information of the first resource pool and the second resource pool, that is, instruct the user equipment to re-read the broadcast message to obtain configuration information of the adjusted first resource pool, second resource pool, and signature.

Figure 6:
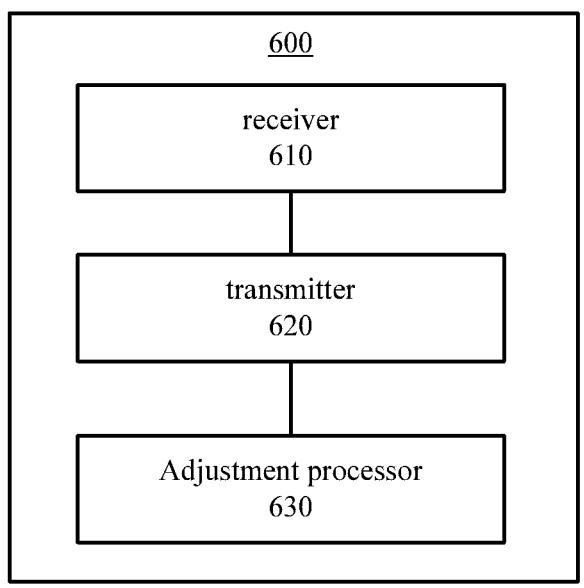
FIG. 6 is a schematic structural diagram of a radio network controller according to an embodiment of the present application.

FIG. 6 is a schematic structural diagram of a radio network controller 600 according to an embodiment of the present application. The radio network controller 600 in FIG. 6 includes a transmitter 610, a receiver 620, and an adjustment processor 630.

The transmitter 610 sends configuration information of an uplink common enhanced dedicated transport channel E-DCH resource pool to a base station, where the configuration information of an uplink common E-DCH resource pool includes information of a first resource pool to which a first transmission time interval corresponds and information of a second resource pool to which a second transmission time interval corresponds. The receiver 620 receives indication information that the base station sends according to usage of the resource pool. The adjustment processor 630 adjusts configuration of the first resource pool according to the indication information.

In an embodiment of the present application, the radio network controller receives the indication information that the base station sends according to the resource usage of the resource pools to which different transmission time intervals correspond, so as to adjust configuration of a resource of a resource pool according to the indication information, so that the range of the resource pool can be dynamically adjusted in the case that a plurality of transmission time intervals coexists.

According to an embodiment of the present application, the indication information includes usage of the resource pool, used for determining an adjustment mode for the configuration of the first resource pool, where the usage of the resource pool includes at least one of the following statistic information: statistic information of a granted resource of the first resource pool, statistic information of resource switching between the first resource pool and the second resource pool, and statistic information of a denied resource of the first resource pool.

Optionally, as another embodiment, the indication information is a common measurement result, where the statistic information of resource switching contains: within a predefined time, the number of user equipments that perform random access and select the first transmission time interval to perform uplink transmission but are authorized to use the second transmission time interval to perform uplink transmission; the transmitting module is further configured to send a common measurement initialization request to the base station, where the common measurement initialization request is used for requesting the base station to report the common measurement result.

According to an embodiment of the present application, the common measurement initialization request includes: a first preset threshold, used for instructing the base station to report the common measurement result when the number contained in the statistic information of resource switching is greater than the first preset threshold.

Optionally, as another embodiment, the adjustment processor 630 increases the range of the first resource pool in the case that the number contained in the statistic information of resource switching is greater than a second preset threshold, where the transmitter 610 further sends a reconfiguration request used for increasing the range of the first resource pool to the base station.

According to another embodiment of the present application, the statistic information of a granted resource of the first resource pool contains: within the predefined time, the number of resources that the base station grants to a user equipment that uses the first transmission time interval to perform uplink transmission; the statistic information of a denied resource of the first resource pool contains: within the predefined time, the number of random access channel preambles that are detected at the base station but are denied to be allocated a common E-DCH resource of the first resource pool.

Optionally, as another embodiment, the adjustment processor 630 increases the range of the first resource pool in the case that the number contained in the statistic information of a granted resource of the first resource pool is greater than a third preset threshold or reaches the total number of resources in the first resource pool configured for the cell where the user equipment is located; or, increases the range of the first resource pool in the case that the number contained in the statistic information of resource switching is greater than zero; or, increases the range of the first resource pool in the case that the number contained in the statistic information of resource switching is greater than zero and the number contained in the statistic information of a granted resource of the first resource pool reaches the total number of resources in the first resource pool configured for the cell; or, increases the range of the first resource pool in the case that the statistic information of a denied resource of the first resource pool is greater than a fourth preset threshold; where the transmitter 610 further sends a reconfiguration request used for increasing the range of the first resource pool to the base station.

Optionally, as another embodiment, the indication information further includes: statistic information of a denied resource, where the statistic information of a denied resource contains: the number of random access channel preambles that are detected at the base station but are denied to be allocated a common E-DCH resource within the predefined time; the indication information is further used for instructing to adjust configuration of the second resource pool; in the case that the number contained in the statistic information of a denied resource is greater than a fifth preset threshold, the adjustment processor 630 increases the range of the second resource pool, where the transmitter 610 further sends a reconfiguration request used for increasing the range of the second resource pool to the base station.

According to an embodiment of present application, the indication information includes: adjustment indication information of the resource pool, used for indicating an adjustment mode for configuration of the first resource pool.

According to an embodiment of the present application, the adjustment indication information of the resource pool includes: the number of resources in the first resource pool that are required by the base station and the number of resources in the second resource pool that are required by the base station, or the number of resources in the first resource pool that are required by the base station and a proportion relationship between the number of resources in the first resource pool that are required by the base station and the number of resources in the second resource pool that are required by the base station, or the number of resources in the second resource pool that are required by the base station and a proportion relationship between the number of resources in the first resource pool that are required by the base station and the number of resources in the second resource pool that are required by the base station, or an index of the resource, or an increment of the number of resources in the second resource pool that is required by the base station.

Optionally, as another embodiment, the indication information further includes: adjustment indication information of a signature, used for indicating an adjustment mode for configuration of the signature, where the adjustment processor 630 further adjusts, according to the adjustment indication information of a signature, the range of a signature used by the user equipment that uses the first transmission interval time to perform uplink transmission.

Optionally, as another embodiment, the adjustment processor 630 further adjusts, according to adjustment to the configuration of the first resource pool, the range of a signature used by the user equipment that uses the first transmission time interval to perform uplink transmission.

Optionally, as another embodiment, after the adjustment processor 630 adjusts the configuration of the first resource pool, the transmitter 610 further instructs the user equipment to re-read information of the first resource pool configured for the base station.

According to an embodiment of the present application, the uplink common E-DCH is used for performing uplink transmission in an idle mode or a forward access channel state of the user equipment, where the first transmission time interval includes a 2 ms transmission time interval and the second transmission time interval includes a 10 ms transmission time interval.

Figure 7:
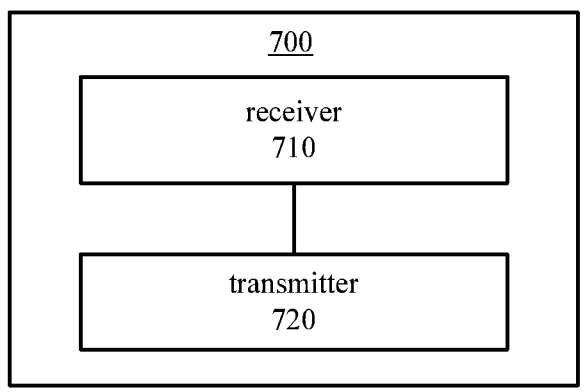
FIG. 7 is a schematic structural diagram of a radio network controller according to another embodiment of the present application.

FIG. 7 is a schematic structural diagram of a radio network controller 700 according to another embodiment of the present application. The radio network controller 700 in FIG. 7 includes a receiver 710 and a transmitter 720.

The receiver 710 is configured to receive configuration information of an uplink common enhanced dedicated transport channel E-DCH resource pool sent by a radio network controller, where the configuration information of an uplink common E-DCH resource pool includes information of a first resource pool to which a first transmission time interval corresponds and information of a second resource pool to which a second transmission time interval corresponds. The transmitter 720 is configured to send indication information to the radio network controller according to resource usage of the resource pool, where the indication information is used by the radio network controller for adjusting configuration of a resource in the first resource pool.

In an embodiment of the present application, the base station may send indication information to the radio network controller according to resource usage of resource pools to which different transmission time intervals correspond, so that the radio network controller adjusts configuration of a resource of a resource pool, and the range of a resource pool can be dynamically adjusted in the case that a plurality of TTI coexists.

According to an embodiment of the present application, the indication information includes usage of the resource pool, used for instructing the radio network controller to determine an adjustment mode for configuration of the first resource pool according to the usage of the resource pool, where the usage of the resource pool includes at least one of the following statistic information: statistic information of a granted resource of the first resource pool, statistic information of resource switching between the first resource pool and the second resource pool, and statistic information of a denied resource of the first resource pool.

Optionally, as another embodiment, the indication information is a common measurement result; the statistic information of resource switching contains: within a predefined time, the number of user equipments that perform random access and select the first transmission time interval to perform uplink transmission but are authorized to use the second transmission time interval to perform uplink transmission; the receiver 710 further receives a common measurement initialization request from the radio network controller, where the common measurement initialization request is used for requesting reporting of the common measurement result; where the transmitter 720 further reports the common measurement result to the radio network controller according to the common measurement request and the resource usage of the first resource pool and/or the second resource pool.

According to an embodiment of the present application, the common measurement initialization request includes: a first preset threshold, used for instructing to report the common measurement result to the radio network controller when the number contained in the statistic information of resource switching is greater than the first preset threshold.

According to an embodiment of the present application, the statistic information of a granted resource of the first resource pool contains: within the predefined time, the number of resources that are granted to a user equipment that uses the first transmission time interval to perform uplink transmission; the statistic information of a denied resource of the first resource pool includes: within the predefined time, the number of random access channel preambles that are detected at the base station but are denied to be allocated a common E-DCH resource of the first resource pool.

Optionally, as another embodiment, the receiver 710 further receives a reconfiguration request sent by the radio network controller and used for increasing the range of the first resource pool.

Optionally, as another embodiment, the indication information further includes: statistic information of a denied resource, where the statistic information of a denied resource contains: within the predefined time, the number of random access channel preambles that are detected at the base station but are denied to be allocated a common E-DCH resource; the indication information is further used by the radio network controller for adjusting the range of the second resource pool; the receiver 710 further receives a reconfiguration request sent by the radio network controller and used for increasing the range of the second resource pool.

According to an embodiment of the present application, the indication information includes: adjustment indication information of the resource, used for indicating an adjustment mode for configuration of the first resource pool.

According to an embodiment of the present application, the adjustment indication information of the resource includes: the number of resources in the first resource pool that are required by the base station and the number of resources in the second resource pool that are required by the base station, or the number of resources in the first resource pool that are required by the base station and a proportion relationship between the number of resources in the first resource pool that are required by the base station and the number of resources in the second resource pool that are required by the base station, or the number of resources in the second resource pool that are required by the base station and a proportion relationship between the number of resources in the first resource pool that are required by the base station and the number of resources in the second resource pool that are required by the base station, or an index of the resource, or an increment of the number of resources in the second resource pool that is required by the base station.

Optionally, as another embodiment, the indication information further includes: adjustment indication information of a signature, used for indicating an adjustment mode for configuration of the signature; the receiver 710 further receives a reconfiguration request sent by the radio network controller and used for increasing the range of the signature.

According to an embodiment of the present application, the uplink common E-DCH is used for performing uplink transmission in an idle mode or a forward access channel state of the user equipment, where the first transmission time interval includes a 2 ms transmission time interval and the second transmission time interval includes a 10 ms transmission time interval.

Persons of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. Persons skilled in the art may use different methods to implement the described functions for each particular application, but it should not be considered that such implementations go beyond the scope of the present application.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the various embodiments provided in the present application, it should be understood that the disclosed system, apparatus, and method may be implemented in other manners, and the previously described apparatus embodiments are merely exemplary. For example, division of the units is merely division based on logical functions and may be another division manner in actual implementation. For example, a plurality of units or components may be combined or integrated into another system, or some features may be ignored or not performed. In addition, the displayed or discussed mutual couplings or direct couplings or communication connections may be implemented through some interfaces; the indirect couplings or communication connections between the apparatuses or units may be implemented in electronic, mechanical or other forms.

The units described as separate parts may or may not be physically separate, and the components displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or a part of the technical solutions may be implemented in the form of a software product. The computer software product is stored in a storage medium and includes several instructions for instructing a computer device (which may be a personal computer, a server, or a network device or the like) or a processor (processor) to perform all or a part of steps of the methods described in the embodiments of the present invention. The storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing descriptions are merely illustrative of specific embodiments of the present application, and are not intended to limit the protection or scope of the present invention. Any variation or replacement readily figured out by persons skilled in the art within the technical scope disclosed in the present application shall fall within the protection scope of the present application. Therefore, the protection scope of the present application shall be subject to the protection scope of the claims.

What is claimed is:

1. A method for adjusting resource configuration, comprising:
   sending configuration information of an uplink common enhanced dedicated transport channel (E-DCH) resource pool to a base station, wherein the configuration information of the uplink common E-DCH resource pool comprises information of a first resource pool to which a first transmission time interval corresponds, and information of a second resource pool to which a second transmission time interval corresponds, wherein the first resource pool comprises common E-DCH resources corresponding to the first transmission time interval, the second resource pool comprises common E-DCH resources corresponding to the second transmission time interval, and the first resource pool is different from the second resource pool;
   receiving indication information that the base station sends according to usage of at least one of the first and second resource pools; and
   adjusting configuration of the first resource pool according to the indication information,
   wherein the indication information comprises resource pool usage information for determining an adjustment mode for the configuration of the first resource pool, the resource pool usage information comprising at least one of the following types of statistic information: statistic information of a granted resource of the first resource pool, statistic information of resource switching between the first resource pool and the second resource pool, and statistic information of a denied resource of the first resource pool.

2. The method according to claim 1, wherein the indication information is a common measurement result, and the statistic information is statistic information of resource switching containing, within a predefined time, the number of user equipments that perform random access and select the first transmission time interval to perform uplink transmission but are authorized to use the second transmission time interval to perform uplink transmission, wherein the method further comprises:
   sending a common measurement initialization request to the base station to request the base station to report the common measurement result.

3. The method according to claim 2, wherein the common measurement initialization request comprises a first preset threshold to instruct the base station to report the common measurement result when the number contained in the statistic information of resource switching is greater than the first preset threshold.

4. The method according to claim 2, wherein adjusting the configuration of the first resource pool according to the indication information comprises:
   in the case that the number contained in the statistic information of resource switching is greater than a second preset threshold, increasing the range of the first resource pool and sending a reconfiguration request to increase the range of the first resource pool to the base station.

5. The method according to claim 2, wherein the statistic information of a granted resource of the first resource pool contains, within the predefined time, the number of resources that the base station grants to a user equipment that uses the first transmission time interval to perform uplink transmission; and the statistic information of a denied resource of the first resource pool contains, within the predefined time, the number of random access channel preambles that are detected at the base station but are denied to be allocated a common E-DCH resource of the first resource pool.

6. A method for adjusting resource configuration, comprising:
   receiving configuration information of an uplink common enhanced dedicated transport channel E-DCH resource pool sent by a radio network controller, wherein the configuration information comprises information of a first resource pool to which a first transmission time interval corresponds and information of a second resource pool to which a second transmission time interval corresponds, wherein the first resource pool comprises common E-DCH resources corresponding to the first transmission time interval, the second resource pool comprises common E-DCH resources corresponding to the second transmission time interval, and the first resource pool is different from the second resource pool; and
   sending indication information to the radio network controller according to resource usage of at least one of the first and second resource pools, wherein the indication information is used by the radio network controller to adjust the configuration of a resource in the first resource pool wherein the indication information comprises information regarding usage of the resource pool, said resource pool usage information being used for instructing the radio network controller to determine an adjustment mode for configuration of the first resource pool, the resource pool usage information comprising at least one of the following types of statistic information: statistic information of a granted resource of the first resource pool, statistic information of resource switching between the first resource pool and the second resource pool, and statistic information of a denied resource of the first resource pool.

7. The method according to claim 6, wherein the indication information is a common measurement result, and the statistic information is statistic information of resource switching containing, within a preset time, the number of user equipments that perform random access and select the first transmission time interval to perform uplink transmission but are authorized to use the second transmission time interval to perform uplink transmission, wherein the method further comprises:
   receiving a common measurement initialization request from the radio network controller to request reporting of the common measurement result;
   and wherein the sending of indication information to the radio network controller according to the resource usage of the resource pool comprises reporting the common measurement result to the radio network controller according to the common measurement request and the resource usage of at least one of the first resource pool and the second resource pool.

8. The method according to claim 7, wherein the common measurement initialization request comprises a first preset threshold to report the common measurement result to the radio network controller when the number contained in the statistic information of resource switching is greater than the first preset threshold.

9. The method according to claim 7, wherein the statistic information of a granted resource of the first resource pool contains, within the predefined time, the number of resources that are granted to a user equipment that uses the first transmission time interval to perform uplink transmission; and the statistic information of a denied resource of the first resource pool contains, within the predefined time, the number of random access channel preambles that are detected at the base station but are denied to be allocated a common E-DCH resource of the first resource pool.

10. A radio network controller, comprising:
a transmitter, configured to send configuration information of an uplink common enhanced dedicated transport channel (E-DCH) resource pool to a base station, wherein the configuration information of an uplink common E-DCH resource pool comprises information of a first resource pool to which a first transmission time interval corresponds and information of a second resource pool to which a second transmission time interval corresponds, wherein the first resource pool comprises common E-DCH resources corresponding to the first transmission time interval, the second resource pool comprises common E-DCH resources corresponding to the second transmission time interval, and the first resource pool is different from the second resource pool;
a receiver, configured to receive indication information that the base station sends according to usage of at least one of the first and second resource pools, wherein the indication information comprises information regarding usage of the resource pool, the adjustment processor is further configured to determine an adjustment mode for the configuration of the first resource pool in accordance with the resource pool usage information, the resource pool usage information comprising at least one of the following statistic information: statistic information of a granted resource of the first resource pool, statistic information of resource switching between the first resource pool and the second resource pool, and statistic information of a denied resource of the first resource pool; and
an adjustment processor, configured to adjust configuration of the first resource pool according to the indication information.

11. The radio network controller according to claim 10, wherein the indication information is a common measurement result and the statistic information of resource switching contains, within a predefined time, the number of user equipments that perform random access and select the first transmission time interval to perform uplink transmission but are authorized to use the second transmission time interval to perform uplink transmission, the transmitting module being further configured to send a common measurement initialization request to the base station, to request the base station to report the common measurement result.

12. The radio network controller according to claim 11, wherein the common measurement initialization request comprises a first preset threshold to instruct the base station to report the common measurement result when the number contained in the statistic information of resource switching is greater than the first preset threshold.

13. The radio network controller according to claim 12, wherein the adjustment processor is further configured to increase the range of the first resource pool in the case that the number contained in the statistic information of resource switching is greater than a second preset threshold, and the transmitter is further configured to send a reconfiguration request to increase the range of the first resource pool to the base station.

14. The radio network controller according to claim 11, wherein the statistic information of a granted resource of the first resource pool contains, within the predefined time, the number of resources that the base station grants to a user equipment that uses the first transmission time interval to perform uplink transmission, and the statistic information of a denied resource of the first resource pool contains, within the predefined time, the number of random access channel preambles that are detected at the base station but are denied to be allocated a common E-DCH resource of the first resource pool.

15. A base station, comprising:
a receiver, configured to receive configuration information of an uplink common enhanced dedicated transport channel E-DCH resource pool sent by a radio network controller, wherein the configuration information of an uplink common E-DCH resource pool comprises information of a first resource pool to which a first transmission time interval corresponds and information of a second resource pool to which a second transmission time interval corresponds, wherein the first resource pool comprises common E-DCH resources corresponding to the first transmission time interval, the second resource pool comprises common E-DCH resources corresponding to the second transmission time interval, and the first resource pool is different from the second resource pool; and
a transmitter, configured to send indication information to the radio network controller according to resource usage of at least one of the first and second resource pool, wherein the indication information is used by the radio network controller for adjusting configuration of a resource in the first resource pool, wherein the indication information comprises information regarding usage of the resource pool, said radio network controller utilizing said resource pool usage information to determine an adjustment mode for configuration of the first resource pool according to the usage of the resource pool, the resource pool usage information comprising at least one of the following types of statistic information: statistic information of a granted resource of the first resource pool, statistic information of resource switching between the first resource pool and the second resource pool, and statistic information of a denied resource of the first resource pool.

16. The base station according to claim 15, wherein the indication information is a common measurement result, the statistic information of resource switching contains, within a predefined time, the number of user equipments that perform random access and select the first transmission time interval to perform uplink transmission but are authorized to use the second transmission time interval to perform uplink transmission, the receiver is operable to receive a common measurement initialization request from the radio network controller to requesting reporting of the common measurement result, and the transmitter is operable to report the common measurement result to the radio network controller according to the common measurement request and the resource usage of at least one of the first resource pool and the second resource pool.

17. The base station according to claim 16, wherein the common measurement initialization request comprises a first preset threshold to instructreport of the common measurement result to the radio network controller when the number contained in the statistic information of resource switching is greater than the first preset threshold.

18. The base station according to claim 16, wherein the statistic information of a granted resource of the first resource pool contains, within the predefined time, the number of resources that are granted to a user equipment that uses the first transmission time interval to perform uplink transmission, and the statistic information of a denied resource of the first resource pool contains, within the predefined time, the number of random access channel preambles that are detected at the base station but are denied to be allocated a common E-DCH resource of the first resource pool.

19. The base station according to claim 15, wherein the utilizes uplink common E-DCH resource to perform uplink transmission in an idle mode or a forward access channel state of the user equipment, the first transmission time interval comprising a 2 ms transmission time interval and the second transmission time interval comprising a 10 ms transmission time interval.

\* \* \* \* \*